United States Patent [19]
Nix

[11] Patent Number: 5,153,619
[45] Date of Patent: Oct. 6, 1992

[54] FLEXLENSE

[76] Inventor: James A. Nix, P.O. Box 81, California, Mo. 65018

[21] Appl. No.: 687,614

[22] Filed: Apr. 19, 1991

[51] Int. Cl.⁵ .............................................. G02C 7/08
[52] U.S. Cl. ...................................... 351/57; 351/159
[58] Field of Search ....................... 351/47, 48, 49, 57, 351/58, 159

[56]  References Cited
U.S. PATENT DOCUMENTS
4,563,065  1/1986  Kneissl ............................ 351/57 X

OTHER PUBLICATIONS

Mentor "Press-on optics have distinct advantages over glass," Apr. 1976 (Journal of American Optometric Assoc.

Primary Examiner—Rodney B. Bovernick

[57] ABSTRACT

An eye safety wear improvement, consisting of a flexible, adhesive, magnification lens, with a diopter power ranging from +1.25 to +4.00 and being adaptable to any eye protection goggles or glasses from welding glass to diving goggles.

1 Claim, 1 Drawing Sheet

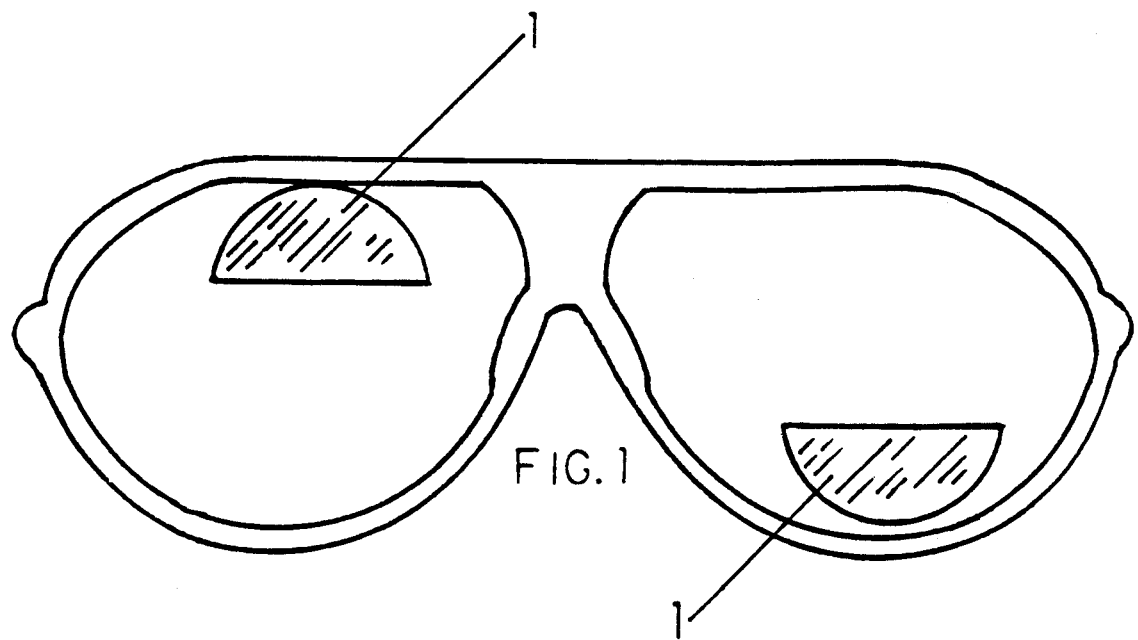
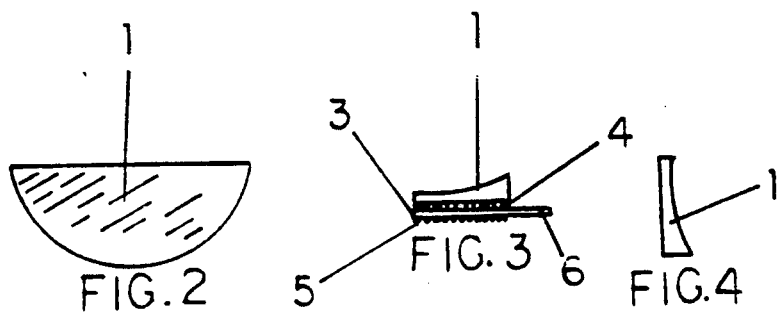
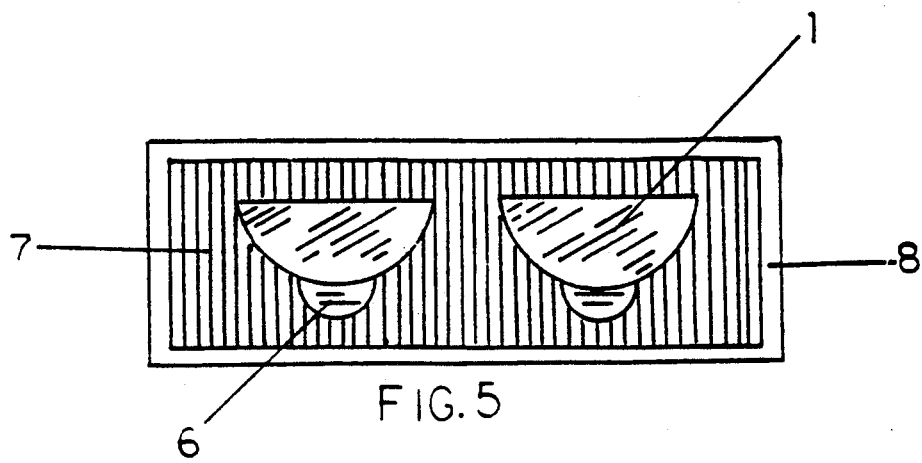

FLEXLENSE

FIELD OF THE INVENTION

The flexlens relates to eye protection wear and is adapted to be used on safety goggles, welding glasses, underwater diving goggles, sports glasses and in any case where spectacles are either impossible to use, unhandy or likely to be damaged or unsafe.

DESCRIPTION OF THE PRIOR ART

Magnifiers have not been available for eye protection wear in the past and workers of an age that their near vision was becoming blurred were left to use reading glasses to see their work but could not wear them with most of their eye protection wear, such as gas welding goggles and underwater goggles.

It was a real problem to put on grinder, eye protection wear, only to have to stop work and take off that eye wear and put on reading glasses or bifocals to see what had been done. The same situation existed in welding and many other jobs which required both near visual inspection and eye protection.

The flexlens is economical, comes in a variety of strengths, shapes and sizes, that cover most common near vision problems and can be permanently attached to most types of eye protection wear in any position that suits the needs of the wearer for the operation he is engaged in.

SUMMARY OF THE INVENTION

A set of flexible, magnifier lens, smooth on opposing sides, coming in a variety of sizes to suit individual needs as to the distance of a particular job and in a variety of shapes to fit individual taste and needs and backed with a clear, permanent adhesive which is protected until use by a clear, thin teflon covering with an extended tab for handling and the teflon itself being backed with a nonpermanent, contact cement that holds it temporarily to a foil backed card used to hold lens during storage and marketing and note the strength and size of the lens and the contact cement also being used to hold lens in place on the eye safety wear temporarily to determine the exact spot they are to be placed permanently, after the teflon is removed and the lens stuck in place.

The object of this invention is to make readily available near vision lens that can be bought at most variety stores at a price that affords near vision lens on any or all of your eye protection wear.

BRIEF DESCRIPTION OF THE DRAWINGS

FIG. 1 is a perspective view of safety goggles with the flexlens located in both the upper viewing area and the lower viewing area.

FIG. 2 is a perspective view of the lens in its most common shape.

FIG. 3 is a horizontal view of the flexlens showing the permanent glue backing the lens, the teflon backing and tab, with the nonpermanent cement on the outer part of the teflon.

FIG. 4 is a side view of the flexlens

FIG. 5 is a prespective view of the flexlens adhered, nonpermanently to a foil backed card.

DESCRIPTION OF THE PREFERRED EMBODIMENT

Like characters of reference designate like parts in those figures of the drawings in which they occur.

In the drawings:

In (FIG. 1) 1, showing the flexlens in two positions to illustrate both the overhead viewing position and the lower viewing position (FIG. 3) showing 4, the permanent glue 3, the teflon covering 6, the extended teflon tab, used for handling and placement 5, being the nonpermanent cement that is used to hold lens in place during storage and in placement on the safety goggles to determine the correct viewing position for the lens and (FIG. 5) showing 7, the antitack foil and 8, the cardboard card that the lens is stored and distributed on, being marked on the back side with the size and power of the lens.

I claim:

1. A card comprising a plurality of plain, non magnetic, near vision lenses, that are smooth on opposing sides for easy cleaning and backed with a clear, permanent glue to easily fix to safety goggles and eye protection wear, with the glue being protected by a thin teflon covering having a tab which protects and preserves the glue until use, the teflon, also being backed with a non permanent cement that is used to attach the lens temporarily to the safety goggles to determine the correct viewing position before the teflon is removed and whereby the lens is permanently fixed to the safety goggles upon application.

* * * * *